(12) United States Patent
Ibrocevic et al.

(10) Patent No.: US 10,663,360 B2
(45) Date of Patent: May 26, 2020

(54) MULTILAYER TACTILE SENSOR WITH FASTENING MEANS

(71) Applicant: PILZ GMBH & CO. KG, Ostfildern (DE)

(72) Inventors: Onedin Ibrocevic, Ostfildern (DE); Matthias Schweiker, Ostfildern (DE); Bernd Neuschwander, Ostfildern (DE); Matthias Kuczera, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 89 days.

(21) Appl. No.: 15/869,153

(22) Filed: Jan. 12, 2018

(65) Prior Publication Data

US 2018/0202874 A1    Jul. 19, 2018

(30) Foreign Application Priority Data

Jan. 17, 2017   (DE) .................. 10 2017 100 791

(51) Int. Cl.
| | |
|---|---|
| *G01L 1/22* | (2006.01) |
| *G01L 1/14* | (2006.01) |
| *G01L 1/26* | (2006.01) |
| *G01L 1/18* | (2006.01) |

(52) U.S. Cl.
CPC .............. *G01L 1/2287* (2013.01); *G01L 1/14* (2013.01); *G01L 1/18* (2013.01); *G01L 1/26* (2013.01)

(58) Field of Classification Search
CPC . G01L 1/205; G01L 1/18; G01L 1/146; G01L 1/2287
See application file for complete search history.

(56) References Cited

U.S. PATENT DOCUMENTS

| | | | | | |
|---|---|---|---|---|---|
| 2,818,040 | A | * | 12/1957 | Krohn | .................. D05B 93/00 112/434 |
| 4,366,765 | A | * | 1/1983 | Hoekstra | ................ D05B 93/00 112/429 |
| 4,734,034 | A | * | 3/1988 | Maness | .................. G01L 1/205 73/865.7 |

(Continued)

FOREIGN PATENT DOCUMENTS

| | | |
|---|---|---|
| DE | 102015120371 B3 | 11/2016 |
| EP | 2528234 B1 | 7/2013 |

(Continued)

*Primary Examiner* — Tran M Tran

(74) *Attorney, Agent, or Firm* — Harness, Dickey & Pierce, P.L.C.

(57) ABSTRACT

Multilayer tactile sensor with a first layer that comprises a first electrode, a second layer that comprises a second electrode and an intermediate layer of pressure-sensitive material that is disposed between the first and second layers and that spaces apart the first electrode from the second electrode. The sensor further comprises a fastening means for fixing the first and second electrodes relative to each other. At least the first electrode is made of electrically conductive yarn and extends along a defined longitudinal direction. The fastening means comprises at least a first seam that extends in the longitudinal direction and that comprises at least one thread that is fed repeatedly multiple times through the pressure-sensitive material in order to fix the first electrode in a defined position.

14 Claims, 8 Drawing Sheets

(56) References Cited

U.S. PATENT DOCUMENTS

| | | | | |
|---|---|---|---|---|
| 4,856,993 A * | 8/1989 | Maness | ............... | G01L 1/205 433/68 |
| 5,159,159 A * | 10/1992 | Asher | ............... | G01L 1/205 178/18.05 |
| 5,824,959 A * | 10/1998 | Mista | ............... | D04B 27/02 174/117 F |
| 6,540,303 B2 * | 4/2003 | Mosquera | ............... | B60N 2/5883 219/217 |
| 6,720,539 B2 * | 4/2004 | DeAngelis | ............... | D02G 3/441 219/545 |
| 6,826,968 B2 * | 12/2004 | Manaresi | ............... | G01L 1/146 73/862.046 |
| 8,069,735 B1 | 12/2011 | Egorov et al. | | |
| 8,904,876 B2 * | 12/2014 | Taylor | ............... | G01L 1/18 73/714 |
| 8,922,100 B2 * | 12/2014 | Whinnery | ............... | D03D 1/0088 310/365 |
| 8,966,997 B2 * | 3/2015 | Taylor | ............... | G01L 1/205 73/862.041 |
| 9,007,192 B2 * | 4/2015 | Tenuta | ............... | G08B 6/00 73/862.041 |
| 9,111,665 B2 * | 8/2015 | Gauckler | ............... | H01B 5/12 |
| 9,322,121 B2 * | 4/2016 | Dunne | ............... | G01L 1/205 |
| 9,429,394 B2 * | 8/2016 | Schultz | ............... | B32B 5/26 |
| 9,448,127 B2 * | 9/2016 | Cannard | ............... | G01L 1/18 |
| 9,642,470 B2 * | 5/2017 | Taylor | ............... | G01L 1/18 |
| 9,645,021 B2 * | 5/2017 | Miura | ............... | G01L 1/22 |
| 9,733,136 B2 * | 8/2017 | Seitz | ............... | G01L 1/146 |
| 10,274,384 B2 * | 4/2019 | Dunne | ............... | D05B 97/12 |
| 10,350,764 B2 * | 7/2019 | Ibrocevic | ............... | G01L 5/0076 |
| 2002/0134116 A1 | 9/2002 | Sandbach | | |
| 2011/0036181 A1 | 2/2011 | Fritzsche et al. | | |
| 2013/0106245 A1 * | 5/2013 | Giebe | ............... | B29C 70/08 310/340 |
| 2017/0148583 A1 | 5/2017 | Hampe et al. | | |
| 2017/0196286 A1 * | 7/2017 | Ito | ............... | A41D 27/24 |
| 2018/0020541 A1 * | 1/2018 | de Kok | ............... | H01R 12/77 |

FOREIGN PATENT DOCUMENTS

| | | |
|---|---|---|
| GB | 2115555 A | 9/1983 |
| GB | 2443208 A | 4/2008 |
| WO | WO-0175924 A1 | 10/2001 |

* cited by examiner

MULTILAYER TACTILE SENSOR WITH FASTENING MEANS

CROSS-REFERENCE TO RELATED APPLICATION

This application claims priority from German patent application DE 10 2017 100 791.1 filed on Jan. 17, 2017. The entire content of the priority application is incorporated herein by reference.

BACKGROUND OF THE INVENTION

The present disclosure relates to a multilayer tactile sensor and a corresponding manufacturing method for such a sensor.

Generic multilayer tactile sensors are known as so-called pressure mats. Pressure mats are two-dimensional sensors with a pressure-sensitive surface that respond to a mechanical load. If for example a person steps on the active surface, the resulting mechanical load is detected and evaluated by a control unit connected to the sensor and converted into a corresponding reaction. A reaction to said event could for instance be turning off a technical system or displaying a warning message.

Known pressure mats are based on the principle that two layers with conductive electrodes are separated by a pressure-sensitive intermediate layer. An electrical property between the electrodes changes if the intermediate layer is compressed. The intermediate layer may comprise compressible elements for this purpose, so that, when pressure is directed transversely to the surface of the pressure mat, the two electrodes are pressed together and the electrodes get into direct contact between the compressible elements.

Alternatively, the intermediate layer can also be made of a material that changes its electrical resistance under pressure. Such an intermediate layer can be a continuous layer, so that even if the two electrodes do not come into direct contact with each other, said change of resistance can be detected using a suitable analysis circuit.

Based on the aforementioned basic principles, it is usually an aim to produce a very large sensor in one piece. For this the individual layers are first produced separately and are assembled to form the actual sensor in a subsequent step. In addition to a continuous intermediate layer, the electrodes may preferably also be configured as a continuous sheet, for example as a textile sheet with electrodes sewn or woven in. In this case, the sensor is formed by laying the individual layers on top of each other and fixing them together. Usually, this is achieved by placing the layers in a housing or laminating them into a composite. Both methods usually restrict the flexibility, in particular the pliability, of the sensor.

Whereas the loss of flexibility is initially insignificant if the sensor is used as a pressure mat, it is desirable for other applications to maintain the original flexibility of the individual layers. Such applications are for example the use of the tactile sensor as a robot skin, when the active surface of the sensor is adapted to the external contour of a robot or in cases in which the sensor is used as a pinch protection means on pinch and shear edges and the sensor being strip-shaped and extending along the edge to be monitored. In both cases, it is desirable to maintain the original flexibility of the individual layers as far as possible.

SUMMARY OF THE INVENTION

It is an object of the present invention to specify a multilayer tactile sensor that avoids the aforementioned disadvantages. In particular, it is an object to specify a tactile sensor that is particularly flexible and pliable. Further, it is an object to specify a tactile sensor that enables different geometries. Yet a further object is to provide a sensor that is simple, robust and inexpensive to manufacture.

According to an aspect of the present disclosure, there is provided a multilayer tactile sensor with a first layer that comprises a first electrode, a second layer that comprises a second electrode and an intermediate layer of pressure-sensitive material that is disposed between the first and second layers and that spaces apart the first electrode from the second electrode, and with a fastening means for fixing the first and second electrodes relative to each other, wherein at least the first electrode is made of electrically conductive yarn and extends along a defined longitudinal direction, and wherein the fastening means comprises at least one first seam that extends along the defined longitudinal direction of the first electrode and that comprises at least one thread that is fed repeatedly multiple times through the pressure-sensitive material in order to fix the first electrode in a defined position.

According to a further aspect of the present disclosure, there is provided a method for manufacturing a multilayer tactile sensor with the steps:

providing a first electrode that forms a first layer and a second electrode that forms a second layer, providing an intermediate layer of pressure-sensitive material that is disposed between the first and second layers and that spaces apart the first electrode from the second electrode, fixing the first and second electrodes relative to each other with a fastening means that spaces the first electrode apart from the second electrode, wherein at least the first electrode is made of electrically conductive yarn and extends along a defined longitudinal direction, and wherein the fastening means comprises at least a first seam that extends in the longitudinal direction and comprises at least one thread, the at least one thread being fed repeatedly multiple times through the pressure-sensitive material in order to fix the first electrode in a defined position.

It is thus an idea to provide a tactile sensor with an electrode extending in a longitudinal direction, in which the electrode is individually fixed with a fastening means. The fastening means is a seam with a thread that is of a similar form to the electrode itself, so that the flexibility of the sensor as a whole is not significantly adversely affected by the fastening means. The sensor is thus more pliable than sensors with laminated layers or sensor that must be housed in some other way to fix the layers or the electrodes.

In addition, the electrodes are perfectly aligned with respect to each other and fixed, since the fastening means extends in the same direction as the electrode and thus holds the electrode securely in place preferably over the entire length. The sensor as a whole can thus be bent or twisted without being restricted in function. This way, the sensor can be fastened directly on uneven contours, such as for example on a robot arm.

Moreover, the individual fixing has the advantage that special geometries of tactile sensors are possible. For example, the individual fixing enables a strip-shaped sensor that is dimensioned relatively long, narrow and thin and can be rolled up and applied like an adhesive tape. Likewise, owing to the omission of a rigid enclosing housing or lamination, positioning on spherical or cylindrical surfaces is possible in a simple manner.

Finally, the fastening means according to the present disclosure can be realized easily and precisely as a seam by machine and thus inexpensively. The manufacture of the new sensor is thus not significantly more difficult. Sensors with geometries different from a plane shape can thus be manufactured particularly simply and inexpensively. At the same time, the seam enables the electrode to be held particularly robustly on the intermediate layer.

In a preferred refinement, the first seam comprises a number of entry and exit openings that are disposed are disposed in parallel and at a defined distance from the conductive yarn of the first electrode. The first seam is thus disposed parallel to the first electrode in order to fix said first electrode uniformly to the intermediate layer. The electrode can thus be particularly precisely fixed and oriented.

In a further refinement, the first layer is a first textile sheet into which the first electrode is sewn or woven, and the thread of the first seam is fed repeatedly multiple times through the pressure-sensitive material and the first textile sheet. In this exemplary embodiment, the first electrode is thus part of a first textile sheet that forms the first layer. This has the advantage that a thin electrode, which may in the special case be only a single conductive thread, can be used. The seam of the fastening means holds the first textile sheet on the intermediate layer and thus fixes the first electrode indirectly. In this refinement, particularly thin electrodes can be used for a sensor that can be handled as part of a larger sheet easily and nevertheless can be precisely and uniformly fixed to the fastening means according to the present disclosure.

In a further refinement, the second layer is a second textile sheet into which the second electrode is sewn or woven, and the thread of the first seam is fed repeatedly multiple times through the pressure-sensitive material, the first textile sheet and the second textile sheet. In this refinement, the second layer is also a textile sheet in which the second electrode is disposed. The first and second layers can each be a sheet that can be handled easily. Thus, the sensor can be manufactured particularly easily and thereby inexpensively. At the same time, said design also enables the second electrode to be designed to be particularly narrow and to be precisely fixed in relation to the first electrode.

In a preferred further refinement, the first textile sheet and the second textile sheet are sections of a common textile sheet that are folded over each other at a lateral edge of the intermediate layer and thus form the first and second layers of the sensor. The first and second textile sheets are thereby part of a common sheet and can thus be manufactured in one piece. The common textile sheet preferably contains a first oblong electrode and a second oblong electrode that are laid around the pressure-sensitive material by folding over each other in order to form an oblong sensor with two mutually parallel electrodes that are spaced apart by the pressure-sensitive material. In this way, a strip-shaped sensor can be implemented particularly easily and inexpensively.

In a particularly preferred refinement, the first seam runs parallel to the first lateral edge and the first and second electrodes are disposed between the first seam and the lateral edge. In said preferred refinement, the common textile sheet forms a woven pouch, on which on the front side the first electrode and on the rear side the second electrode is disposed. The pouch contains a section of the pressure-sensitive material that spaces apart from each other the front and rear sides of the pouch. The first seam closes the pouch and furthermore fixes the intermediate layer to the common textile sheet, preferably on both sides. By such a woven pouch, strip-like sensors can be produced particularly easily in a few working steps and with only a few basic components.

In a further refinement, the fastening means comprises a second seam that is disposed parallel to the first seam so that the first electrode is disposed between the first and second seams. In this exemplary embodiment, the first and preferably the second electrode are disposed between a first seam and a second seam. The electrodes can thus be particularly precisely aligned and fixed relative to each other.

In a further refinement, the thread of the first seam repeatedly overlaps the conductive yarn of the first electrode, preferably over the entire length of the first electrode, and holds the first electrode on the intermediate layer. By overlapping the conductive yarn of the first electrode repeatedly, the electrode is pressed against the intermediate layer and thereby fixed to the intermediate layer particularly well. This refinement enables a tactile sensor to be provided, the first layer of which can be formed exclusively of an individual electrode, wherein in a special case the electrode consists of an individual thread of the conductive yarn. In this way, a particularly narrow and flexible sensor can be implemented.

In a further refinement, the first seam is a first zigzag seam with at least one thread defining a first zigzag pattern having short sections that are concatenated at acute angles so that the ends thereof describe two parallel lines or curves, between which the first electrode is disposed in parallel. By using a zigzag seam, the electrode can be particularly easily and precisely fixed to the intermediate layer. At the same time, zigzag seams can be particularly easily produced by machine, so that the fixing can be manufactured particularly easily.

In a further refinement, the fastening means comprises a further seam with at least one further thread that is repeatedly fed through below the electrically conductive yarn in order to space the first electrode apart from the intermediate layer. In this refinement, the first electrode is supported by a further seam of the intermediate layer. The further seam is thereby used as a spacer between the first electrode and the pressure-sensitive material. By varying the distance between the individual supporting points, i.e. the points at which the further seam crosses the electrode, the sensitivity of the sensor can be adjusted. If the supporting points lie close to each other, the pressure loading needs be greater in order to actuate the sensor. On the other hand, if the supporting points are further apart, a lower pressure is sufficient to achieve the same result.

In a preferred refinement, the thread of the first seam crosses the first electrode at a first defined interval and the thread of the further seam crosses the first electrode at a second defined interval, wherein the first and the second defined intervals are different. In said preferred design, not only can the sensitivity of the sensor be adjusted by the spacer, but the downforce on the first seam can also be varied. Thereby, the refinement enables the sensor to be variably adjusted just by the selection and configuration of the fastening means.

It will be understood that the aforementioned features and the features that are yet to be described can be used not only in the respectively specified combination, but also in other combinations or on their own, without departing from the scope of the present invention.

BRIEF DESCRIPTION OF THE DRAWINGS

Exemplary embodiments of the invention are represented in the drawing and are described in detail in the subsequent description. In the figures.

DESCRIPTION OF PREFERRED EMBODIMENTS

Figure 1:
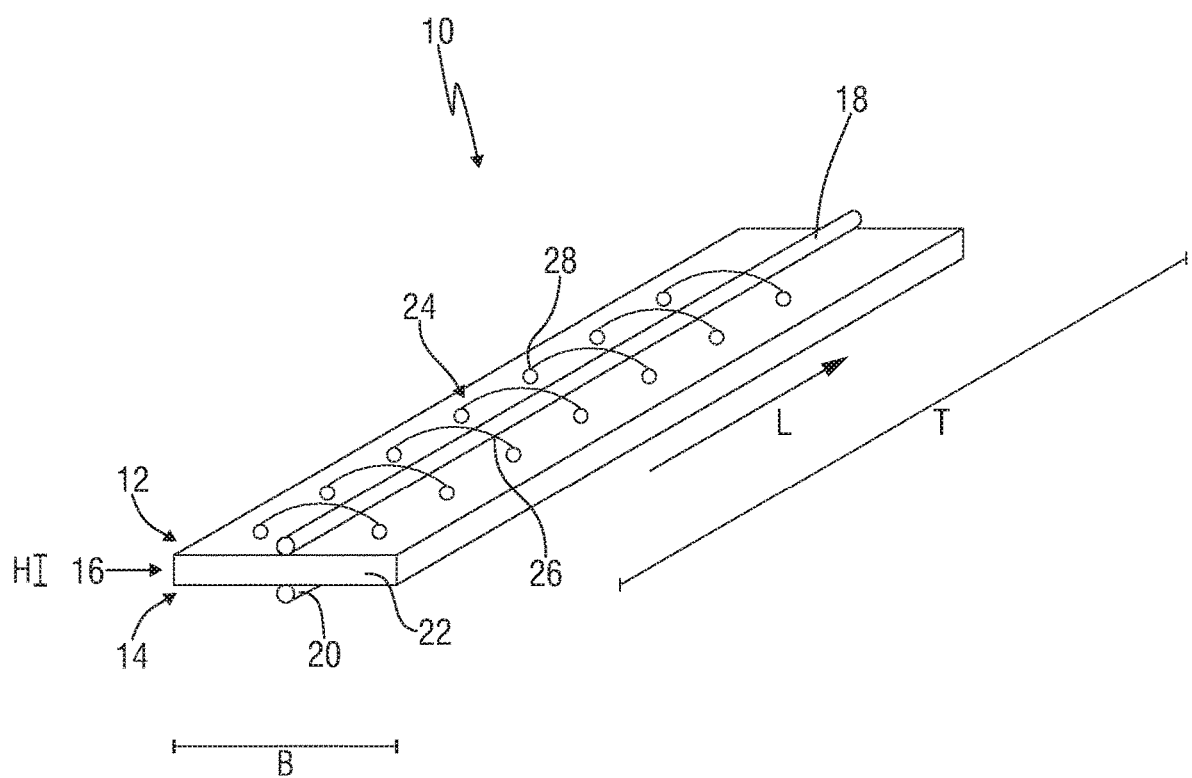
FIG. 1 shows a first exemplary embodiment of the new sensor in a perspective view.

FIG. 1 shows a first exemplary embodiment of the sensor in a perspective view. The sensor is denoted here in its entirety with reference numeral 10. The sensor 10 is multi-layered and at least comprises a first layer 12, a second layer 14 and an intermediate layer 16 that is disposed between the first and the second layer. The first layer 12 comprises a first electrode 18 and the second layer 14 comprises a second electrode 20.

In this exemplary embodiment, the first and second electrode 18, 20 are made of electrically conductive yarn. In particular, the first and second electrode 18, 20 in this exemplary embodiment are each a thread of an electrically conductive yarn and thus flexible. In general, an electrically conductive yarn is a linear textile fabric that can be processed into weaves, knits, crocheting and embroidery and can particularly be used for sewing. Compared to a normal yarn, a conductive yarn is able to carry electric current. This can be achieved by spinning the yarn from conductive fibres, for example, stainless steel fibres. Alternatively, a conventional non-conductive thread can be made conductive by coating the thread with conductive material. For example, an ordinary nylon thread can be coated with silver in order to obtain a conductive thread. The different types of conductive yarn have different advantages and disadvantages regarding strength and conductivity, but can be used equally in relation to the new sensor. It is decisive that the thread is entirely conductive and at the same time retains its textile-like properties, in particular its flexibility and pliability.

In the exemplary embodiment according to FIG. 1, only a single electric thread is shown as the first electrode and as the second electrode 18, 20. This is a special case. In other embodiments, the first and second electrode 18, 20 may also be made from a plurality of electrically conductive threads. In the following, the special case as shown in FIG. 1 with only a single thread of conductive yarn as an electrode is referred to as a "single-yarn electrode".

Further, in the exemplary embodiment according to FIG. 1, the first and second electrode 18, 20 are of the same design. It will be understood that this does not necessarily have to be the case and that in other embodiments an electrode in the first layer can be of a different design than an electrode in the second layer.

Having electrodes 18, 20 formed as yarn requires that the electrodes 18, 20 extend essentially in a longitudinal direction L. Nevertheless, the electrodes do not have to be straight. In fact, the electrodes may extend in an arc, depending on the geometry that the corresponding application requires.

The first and second electrode 18, 20 run parallel to each other in this exemplary embodiment and are spaced apart from each other by the intermediate layer 16. The intermediate layer 16 is made of a pressure-sensitive material 22. For example, the intermediate layer may comprise compressible elements that are forced apart if pressure is applied transverse to the electrodes 18, 20, so that the first and second electrode 18, 20 come into contact at the point of the pressure loading. Alternatively, a material that changes its electrical property between the first and second electrode 18, 20 under pressure may be used for the intermediate layer. In particular, a material can be used that changes its electrical resistance under pressure. Such an intermediate layer 16 may preferably be spread across the whole surface as shown here.

Regardless of its design, if pressure is applied perpendicularly to the intermediate layer 16, a changed electrical property between the first and second electrode 18, 20 may be detected by an analysis circuit (not shown here). In the special case of a sensor with a "single-yarn electrode" as represented in FIG. 1, the same working principle as with a pressure mat having electrodes extending in the surface applies.

Moreover, the new sensor comprises a fastening means 24 that holds at least the first electrode on the intermediate layer 16 in a defined position. The fastening means 24 comprises at least one first seam 26 that extends in the longitudinal direction L defined by the first electrode. This means that the seam 26 comprises entry and exit openings 28 that run in parallel to the first electrode 18. A thread is repeatedly fed multiple times through the pressure-sensitive material 22 through the entry and exit openings 28 in order to hold the first electrode 18 on the intermediate layer 16. In the exemplary embodiment shown here, for this purpose the thread is repeatedly passed over the first electrode, thereby pressing the electrode onto the intermediate layer 16.

It will be understood that in preferred embodiments, if the second electrode 20 is embodied in a similar way to the first electrode, the second electrode may also be fastened to the intermediate layer 16 by a seam. Particularly preferably, in this case the second electrode 20 is also hold by the first seam 26, so that only one fastening means 24 is necessary for the first and the second electrode 18, 20. The thread of the first seam 26 comprises similar properties in this case—apart from the conductivity—as the electrically conductive yarn of the first or second electrode 18, 20, so that the sensor as a whole retains the flexibility of the electrodes. Thus, the flexibility of the sensor is not significantly limited by the fastening means 24. At the same time the first electrode 18 is held in a defined position even during twisting or bending of the sensor 10.

Preferably, the sensor according to the invention is used as a strip-shaped sensor for protecting pinch and shear edges, for example in industrial production systems, automatic doors, gates or windows in building technology or vehicle doors in public passenger transport. A preferred sensor thus extends essentially in a longitudinal direction L, and a height H and a width B of the sensor are small in relation to its depth T. In preferred embodiments, the depth T is at least ten times the width B. Furthermore in a preferred embodiment, the sensor may be rolled up and applied like an adhesive tape. A sensor according to the invention may be produced as a continuous item which is cut into the final form by the end user. The robustness achieved by the individual fixing of the electrodes is not lost by this, since the robustness only depends on the design of the electrode and not on the geometry of the sensor.

It will be understood that the present invention is not limited to the aforementioned strip-shaped sensors, but an individual fixing can also be used with tactile sensors of other shapes having different geometries.

Figure 2:
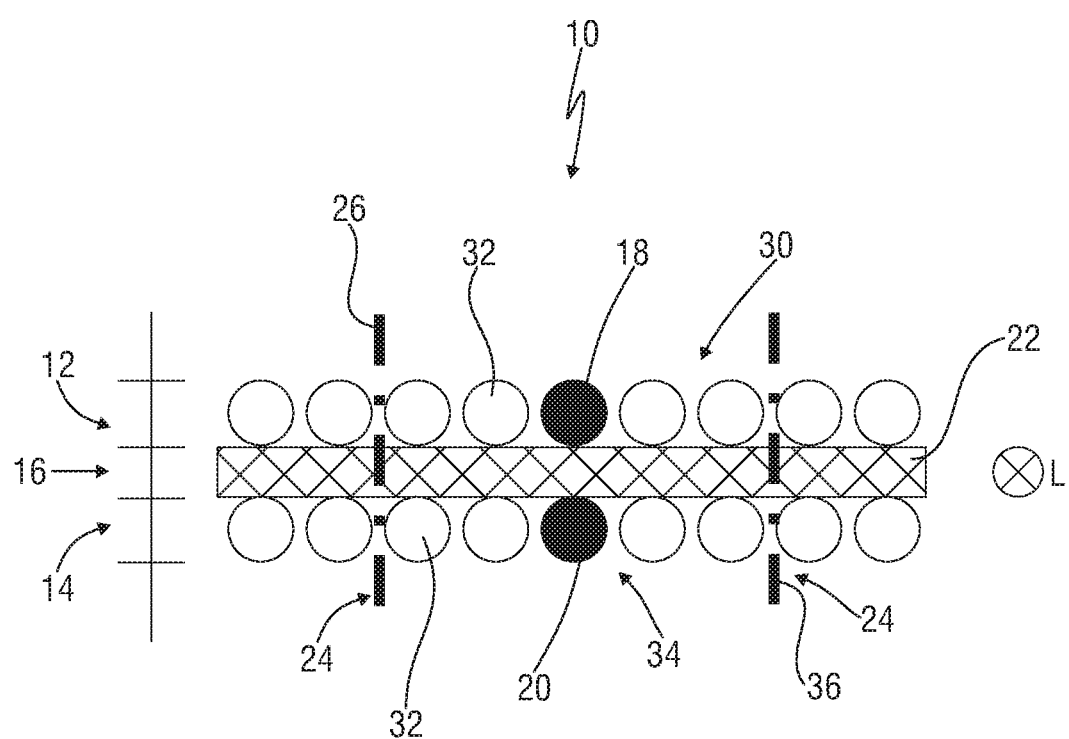
FIG. 2 shows a second exemplary embodiment of a new sensor in a cross-sectional view.

With reference to FIG. 2, a second exemplary embodiment of a sensor according to the invention is described. FIG. 2 shows a cross-sectional view of the new sensor. The same reference numerals denote the same parts as in the exemplary embodiment according to FIG. 1.

In contrast to the exemplary embodiment according to FIG. 1, the first and second layers are not exclusively made of an electrode of conductive yarn. In fact, the conductive electrodes 18, 20 are each part of a textile sheet. A first textile sheet 30 forms the first layer 12 and comprises further non-conductive threads 32 in addition to the first electrode 18 of electrically conductive yarn. The non-conductive threads 32 and the first electrode 18 extend in a longitudinal direction L in the plane of the figure and are woven with threads running transverse to the longitudinal direction in order to form a textile workpiece. The first sheet is thus a textile fabric that is made of conductive and non-conductive threads.

As with the first electrode 18, the second electrode 20 in this exemplary embodiment is also woven with non-conductive threads to form a second sheet 34. The first and second textile sheets 30, 34 are applied to opposite sides of the intermediate layer 16. The regions in which the first and second electrodes 18, 20 overlap form the active regions, in which compression of the pressure-sensitive material 22 of the intermediate layer 16 can be registered by the first and second electrodes 18, 20. In the exemplary embodiment shown here, the first electrode 18 and the second electrode 20 are disposed parallel to each other over their entire length, so that the active region is defined by the dimensioning of the first and second electrodes 18, 20. It will be understood that a different arrangement of the electrodes is conceivable. In particular, in other embodiments further electrodes may be provided that are disposed in a matrix in order to define pressure-sensitive cells that can be polled individually.

In the exemplary embodiment according to FIG. 2, a second seam 36 is provided besides the first seam 26, which together form the fastening means 24. In this exemplary embodiment, the thread of the first seam 26 and the thread of the second seam 36 are both fed through the first layer 12, the second layer 14 and the intermediate layer 16 repeatedly multiple times. The seams 26, 36 run along the longitudinal direction L parallel to the first and second electrodes 18, 20. Neither the first seam 26 nor the second seam 36 in this exemplary embodiment is directly connected to the first or the second electrode 18, 20 in order to fix the same. In fact, the first seam 26 and the second seam 36 are bound to the first textile sheet 30 and the second textile sheet 34 in order to be fixed to the intermediate layer 16. As both the first electrode 18 and the second electrode 20 are each woven into the first or second sheet 30, 34, the fastening means 24 fixes the first seam 26 and the second seam 36 and thus the electrodes in a defined position relative to each other. Thus, in this exemplary embodiment the electrodes are only fixed indirectly by means of the seams 26, 36.

The pliability of the sensor 10 primarily depends on the pliability of the individual layers 12, 14, 16 and is essentially not influenced by the first and second seams 26, 36. Nevertheless, the electrodes 18, 20 remain in a defined position, even during bending or twisting of the sensor. Since the seams in this exemplary embodiment cannot come into direct contact with the electrodes, the seams may also be of conductive yarn and may possibly contribute to the contacting of the electrodes or other components of the sensor.

Figure 3:
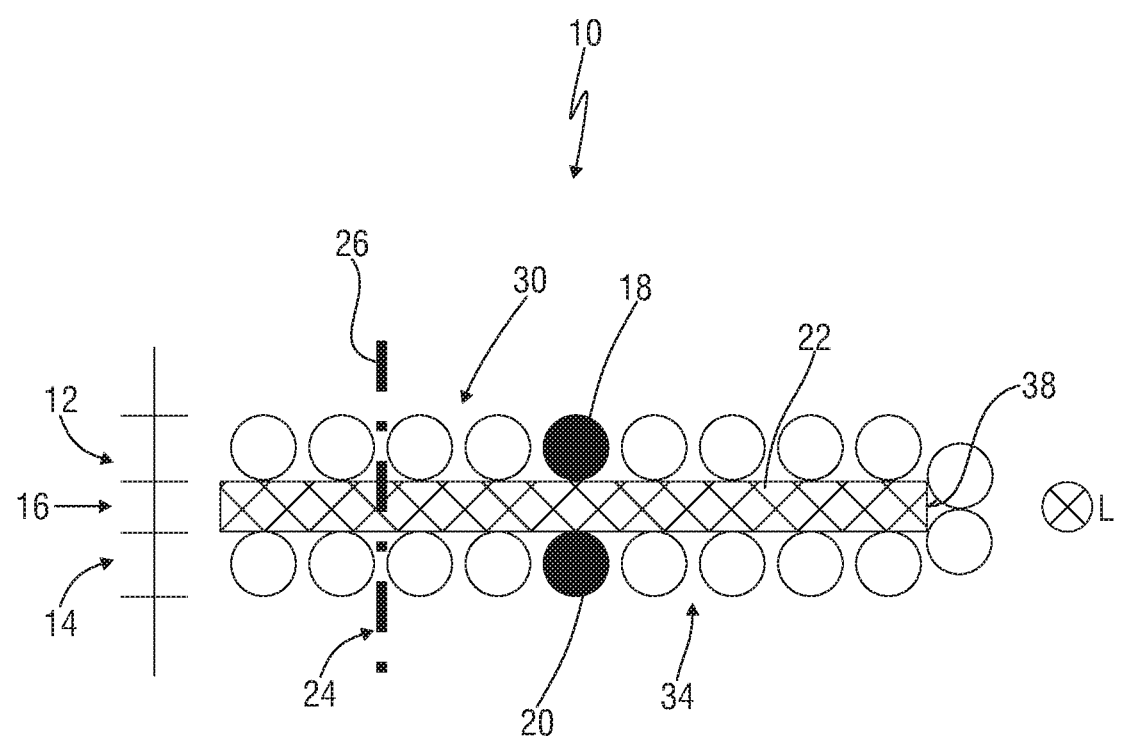
FIG. 3 shows a third exemplary embodiment of a new sensor in a cross-sectional view.

With reference to FIG. 3, a further refinement of the exemplary embodiment of FIG. 2 is described in detail below. FIG. 3 also shows the new sensor in a cross-sectional view, wherein the same reference numerals denote the same parts.

In the exemplary embodiment according to FIG. 3, the first electrode 18 and the second electrode 20 are also parts of a textile sheet. However, in contrast to the previously described example, the first sheet 30 and the second sheet 34 are sections of a common sheet that is folded about a lateral edge 38 of the pressure-sensitive material 22 of the intermediate layer 16. Thus, in this exemplary embodiment the first and second layers 12, 14 are formed as a result of folding a one-piece textile workpiece over itself. As with an envelope, the intermediate layer 16 of pressure-sensitive material 22 is inserted into the folded sheet. The sheet is preferably folded around the lateral edge 38 so that the first electrode 18 and the second electrode 20 lay one top of each other. The region in which the first electrode 18 and the second electrode 20 overlap is the active region of the sensor 10. In the exemplary embodiment shown here, the first electrode 18 and the second electrode 20 overlap over the entire length in the longitudinal direction L.

Further, in contrast to the aforementioned exemplary embodiment, according to FIG. 3 an individual seam 26 is provided as a fastening means 24. In this exemplary embodiment, the individual seam 26 runs parallel to the first and second electrode 18, 20 and the lateral edge 38. The seam 26 thus closes the envelope in which the pressure-sensitive material 22 of the layer 16 is inserted like a letter. Here the seam 26 fixes the first layer 12, the second layer 14 and the intermediate layer 16 together by passing the seam 26 through the first sheet 30, the second sheet 34 and the intermediate layer 16.

In this way, a band-shaped sensor according to the exemplary embodiment of FIG. 3 can be implemented particularly simply and inexpensively, because only one seam has to be put in place and only a one-piece workpiece with woven-in electrodes and an intermediate layer is necessary in addition to the seam.

Figure 4:
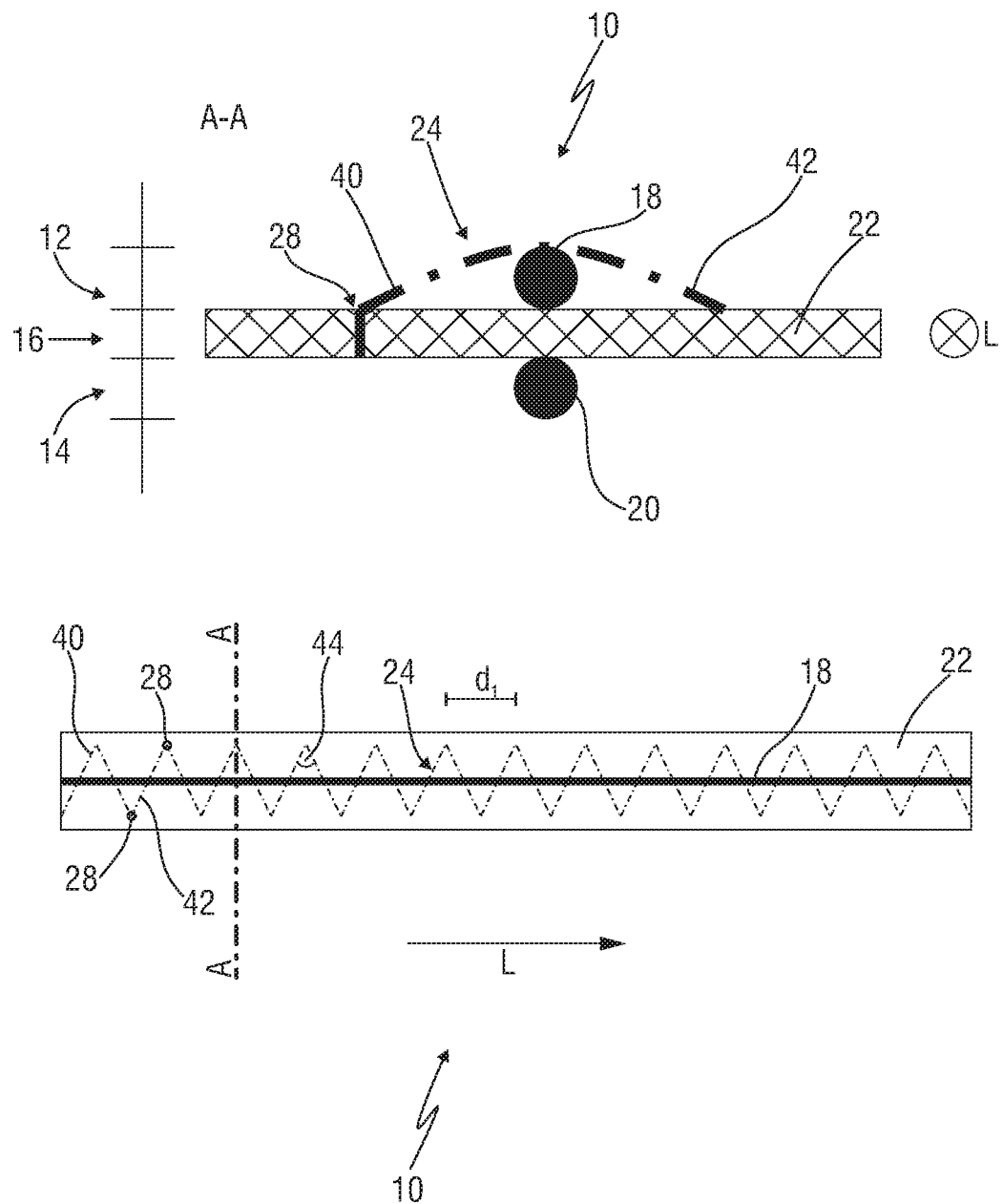
FIG. 4 shows a fourth exemplary embodiment of a new sensor in a cross-sectional view and in a top view.
Figure 5:
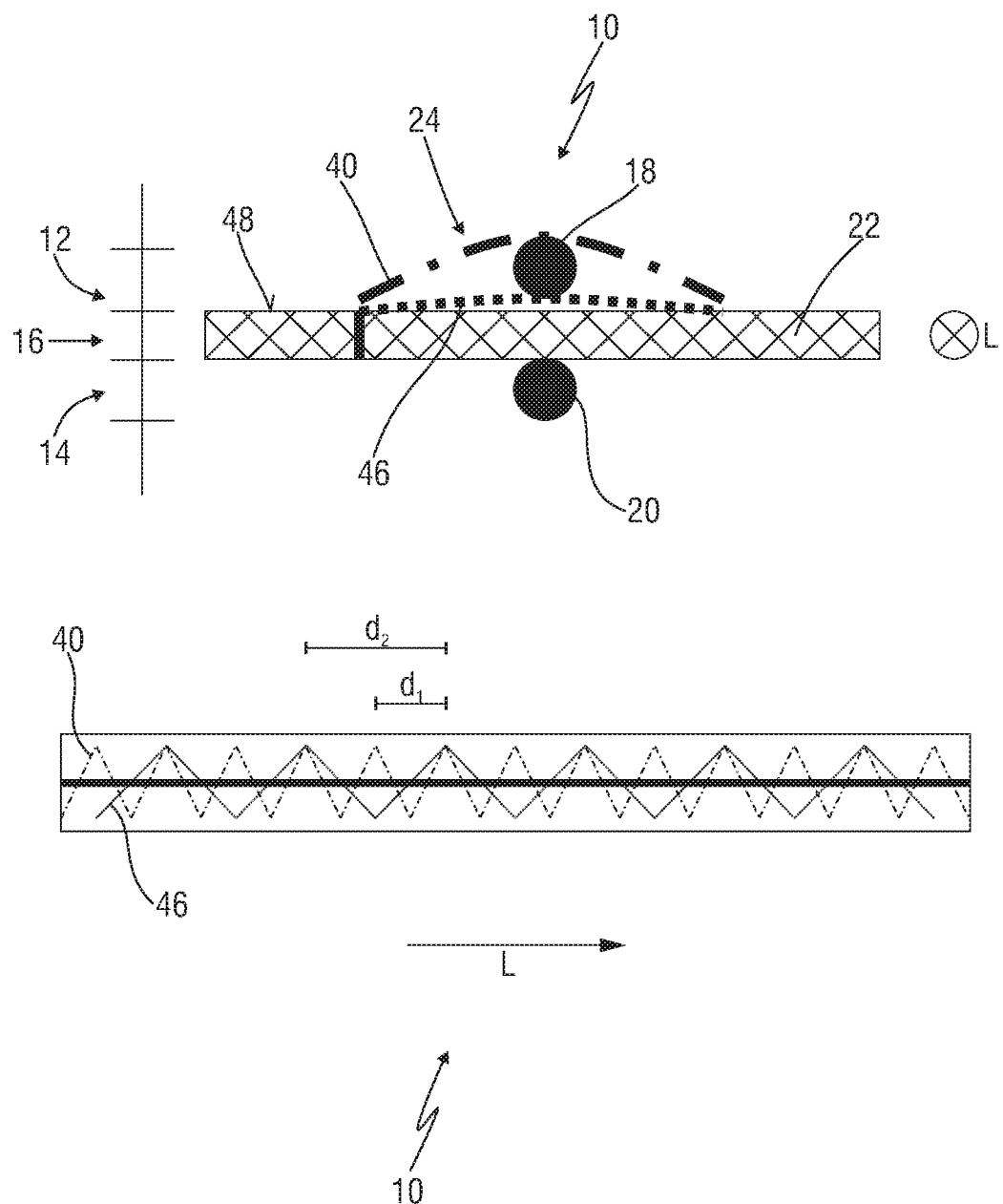
FIG. 5 shows a fifth exemplary embodiment of the new sensor in a cross-sectional view and in a top view.

FIG. 4 and FIG. 5 show two further exemplary embodiments of the new sensor. FIG. 4 shows the new sensor both in a top view in the lower section and in a cross-sectional view in the upper half of the figure. The same reference numerals denote the same parts. Here, as in the exemplary embodiment according to FIG. 1, the sensor 10 comprises a single electrode in a first layer 12 and a single electrode in a second layer 14. Thus, both layers comprise a "single-yarn-electrode". It will be understood, however, that fixing the electrodes as described in detail below is not limited to this design, but can also be used with electrodes of other designs. In particular, an electrode can also be composed of a plurality of threads that lay adjacent to each other, are twisted or woven.

As in the preceding exemplary embodiments, the first electrode 18 and the second electrode 20 are spaced apart from each other by an intermediate layer 16 of pressure-sensitive material 22. The first and second electrodes 18, 20 extend along a longitudinal direction L and thereby essentially determine the dimension of the sensor 10. The sensor 10 is thus a strip-shaped sensor that is relatively long, narrow and thin, and may for example be applied to narrow edges of doors or windows. The active region of the sensor corresponds to the region in which the first electrode 18 and the second electrode 20 overlap. A compression of the pressure-sensitive material 22 in the close surroundings of the first electrode and the second electrode 18, 20 can be detected by the sensor 10 by monitoring a change of an electric property between the first electrode 18 and the second electrode 20 caused by the compression.

The first electrode 18 is held on the intermediate layer 16 by a fastening means 24. The fastening means 24 comprises here a zigzag seam 40 with a thread that defines a first zigzag pattern. The thread is fed through the pressure-sensitive material 22, exits from an entry and exit opening 28 out of the pressure-sensitive material 22 and is fed via the first electrode 18 to a further entry and exit opening 28, through which it enters the pressure-sensitive material 22. The short sections 42 that the thread defines between the individual entry and exit openings 28 are concatenated at the same angles 44, so that the ends, i.e. the entry and exit openings 28, describe two parallel lines or arces with the first electrode 18 in between. The entry and exit openings 28 are preferably disposed on the respective side of the first electrode 18 at the same distance therefrom, so that the electrode is uniformly pressed onto the intermediate layer 16 by the short sections 42. In other words, the zigzag seam 40 crosses the first electrode 18 in the longitudinal direction L at a defined interval $d_1$. A zigzag seam 40 can be particularly simply produced by machine. At the same time, the first electrode 18 is optimally fixed in a predetermined position by the zigzag seam 40.

It will be understood that in addition to a zigzag pattern, a different seam pattern may be used, with which the first electrode 18 is pressed onto the intermediate layer 16 and fixed in a defined position. The zigzag pattern is preferred because it can be produced particularly easily. Moreover, in another embodiment the second electrode 20 can also be fixed to the intermediate layer 16 in the same way with a suitable seam.

FIG. 5 shows a refinement of the exemplary embodiment of the sensor according to FIG. 4. The same reference numerals refer to the same parts. FIG. 5 shows the sensor 10 both in a top view (at the bottom) and also in a sectional view (at the top).

As in the preceding exemplary embodiment, the first and second layer 12, 14 each comprise a single electrode 18, 20 and are spaced apart from each other by an intermediate layer 16 of pressure-sensitive material 22. The first electrode 18 is held on the intermediate layer 16 by a first zigzag seam 40.

In addition to the preceding exemplary embodiment, the fastening means 24 comprises a second zigzag seam 46 in addition to the first zigzag seam 40. As with the first zigzag seam 40, the second zigzag seam 46 also extends in the longitudinal direction L defined by the first electrode 18. In contrast to the first zigzag seam 40, the second zigzag seam 46 is disposed below the first electrode 18 between the first electrode 18 and the intermediate layer 16. In other words, the second zigzag seam 46 directly contacts the surface of the intermediate layer 16. Further, the second zigzag seam 46 crosses here the first electrode 18 at a defined interval $d_2$. Thus, the first electrode 18 does not lie directly on the first intermediate layer 16 at the crossing points, but is supported by the second zigzag seam 46.

The second zigzag seam 46 consequently acts as a spacer in this exemplary embodiment, by which the sensitivity of the sensor 10 can be adjusted. By increasing the number of supporting points, the sensor 10 can be adjusted so that a greater pressure must be exerted on the electrode 18 and the intermediate layer 16 in order to cause a change in the electrical properties between the first electrode 18 and the second electrode 20. In particular, a high pressing force that is exerted on the first electrode 18 by the first zigzag seam 40 can be compensated and balanced by the second zigzag seam 46.

Overall, the sensitivity of the sensor can be advantageously adjusted by varying the distances of the supporting points and/or the distances of the overlappings of the first and second zigzag seams 40, 46. Thus, the fastening means 24 is used in this exemplary embodiment not only as an individual fixing of an electrode, but also as the adjustment means for controlling the sensitivity of the sensor. It is conceivable that in other embodiments an interval of the supporting points ($d_2$) or an interval of the overlappings ($d_1$) can be varied in the longitudinal direction L in order to provide a different sensitivity at different points of the sensor. Thus, different regions of the sensor can be provided with different sensitivity by means of the fastening means 24 alone. It will be understood that a different seam than a zigzag seam may be used in another embodiment for fastening or as a spacer.

Whereas the fastening means 24 has been described in the present exemplary embodiments for the first electrode 18, it is also conceivable that the same fastening means 24 may be used for the second electrode 20. It is also conceivable that the different fastening means of the individual exemplary embodiments may be combined with each other. For example, a zigzag seam may also be used if the first and/or the second layer are a textile sheet. Moreover, it is conceivable that a first fastening means 24 is used for the first layer 12 and a different fastening means is used for the second layer 14. In this respect, the individual fastening means for each layer can be varied at will. It will also be understood that the exemplary embodiments shown are particularly suitable for the special case of a "single-yarn electrode", but may also be used for electrodes that are made up of a plurality of threads of conductive yarn.

Figure 6:
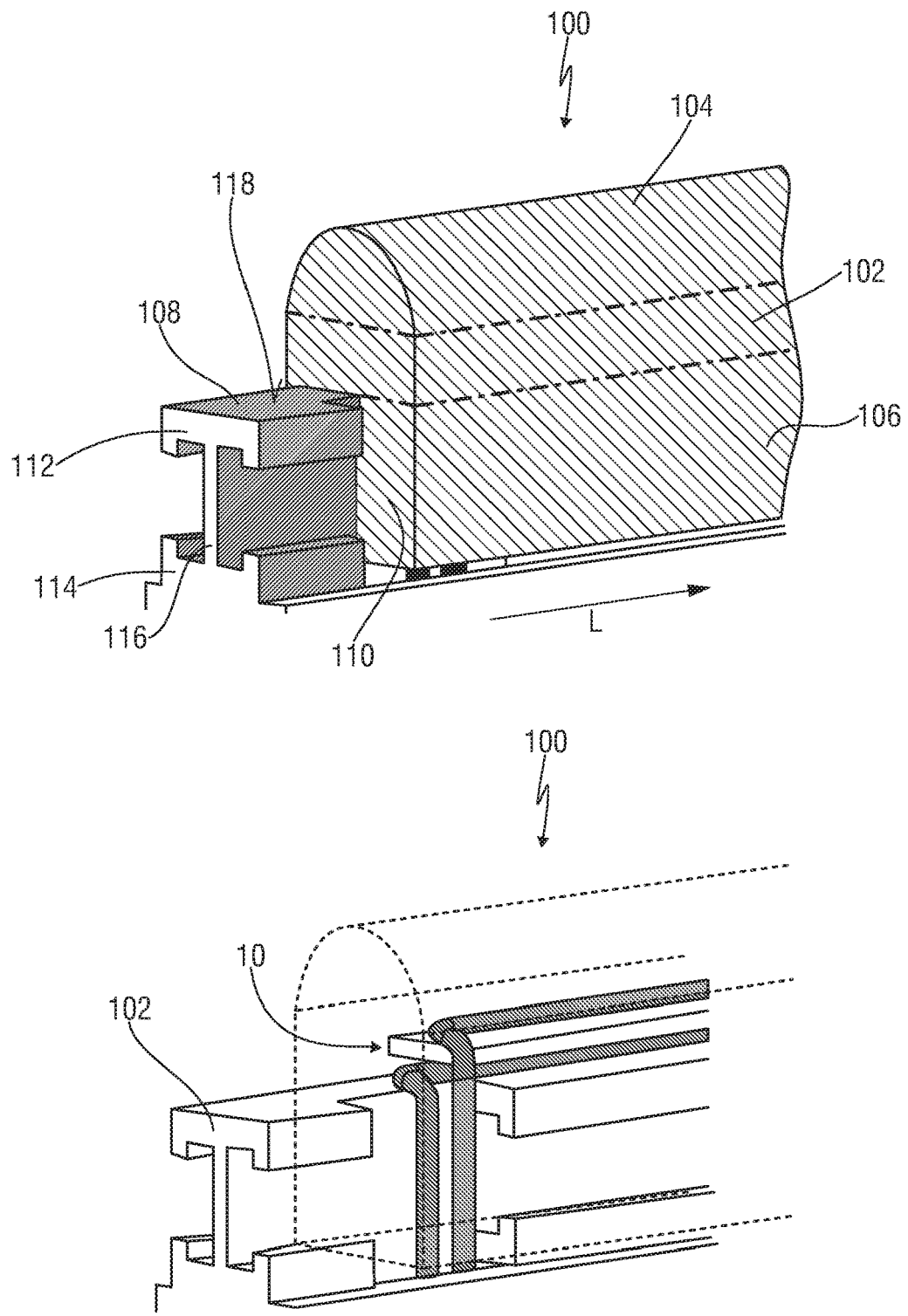
FIG. 6 shows an exemplary embodiment of a housing for a new sensor in a perspective view.

With reference to FIG. 6, a preferred exemplary embodiment of a housing for a sensor that has been disclosed above is described below. The housing is particularly designed for fastening and for protecting a strip-shaped sensor. FIG. 6 shows in two images the sensor in a perspective view. The upper image shows the housing in a closed form, whereas the lower image shows a view into the interior of the housing, wherein the external contours are represented here by dashed lines. In both images the same reference numerals refer to the same parts.

The housing, which is referred to in its entirety with the reference numeral 100, is divided into a basic body 102, a compression body 104 and a joining section 106. Because the housing is made as one piece of elastic material, the compression body 104, the basic body 102 and the joining section 106 transition seamlessly into each other. A strip-shaped sensor unit 10 is disposed within the sensor 100, more accurately speaking within the basic body 102. The strip-shaped sensor unit 10 is preferably a sensor, as has been previously described with reference to FIGS. 1 to 5. In particular, it is thus a sensor that comprises at least one electrode of conductive yarn. Representative of such a sensor indicated here is the special case with a "single-yarn electrode". As with the sensor to be housed, the housing 100 extends essentially along a longitudinal direction L.

The housing 100 is mounted together with the sensor unit 10 on a support 108 that is not part of the housing but that works in conjunction with the housing in order to support the sensor 10 suitably and to shield it against external influences. The housing 100 is preferably form-fitted with the support 108. For this purpose, the housing comprises connecting elements 110 in the joining section 106 that are shaped so as to engage a positive-locking in the support 108. The support 108 is thereby preferably an oblong profile, to the external shape of which the connecting elements 110 are matched.

In the exemplary embodiment shown here, the support 108 is a double-T-profile with an upper flange 112 and a lower flange 114 and a central pillar 116 joining the two flanges. The upper flange 112 has a flat surface 118 that acts as the supporting surface for the sensor unit 10. The surface 118 thus forms a stable and uniform base for the sensor unit 10. Furthermore, the housing 100 encloses the supporting surface 118 together with the sensor unit 10. The sensor unit 10 is thus tightly enclosed in the housing 100. By means of the compression body 104, shocks are uniformly transferred to the sensor unit 10. The specific form of the basic body 102, the compression body 104 and the joining section 106 and the functions thereof are described in detail below with reference to FIG. 7.

Figure 7:
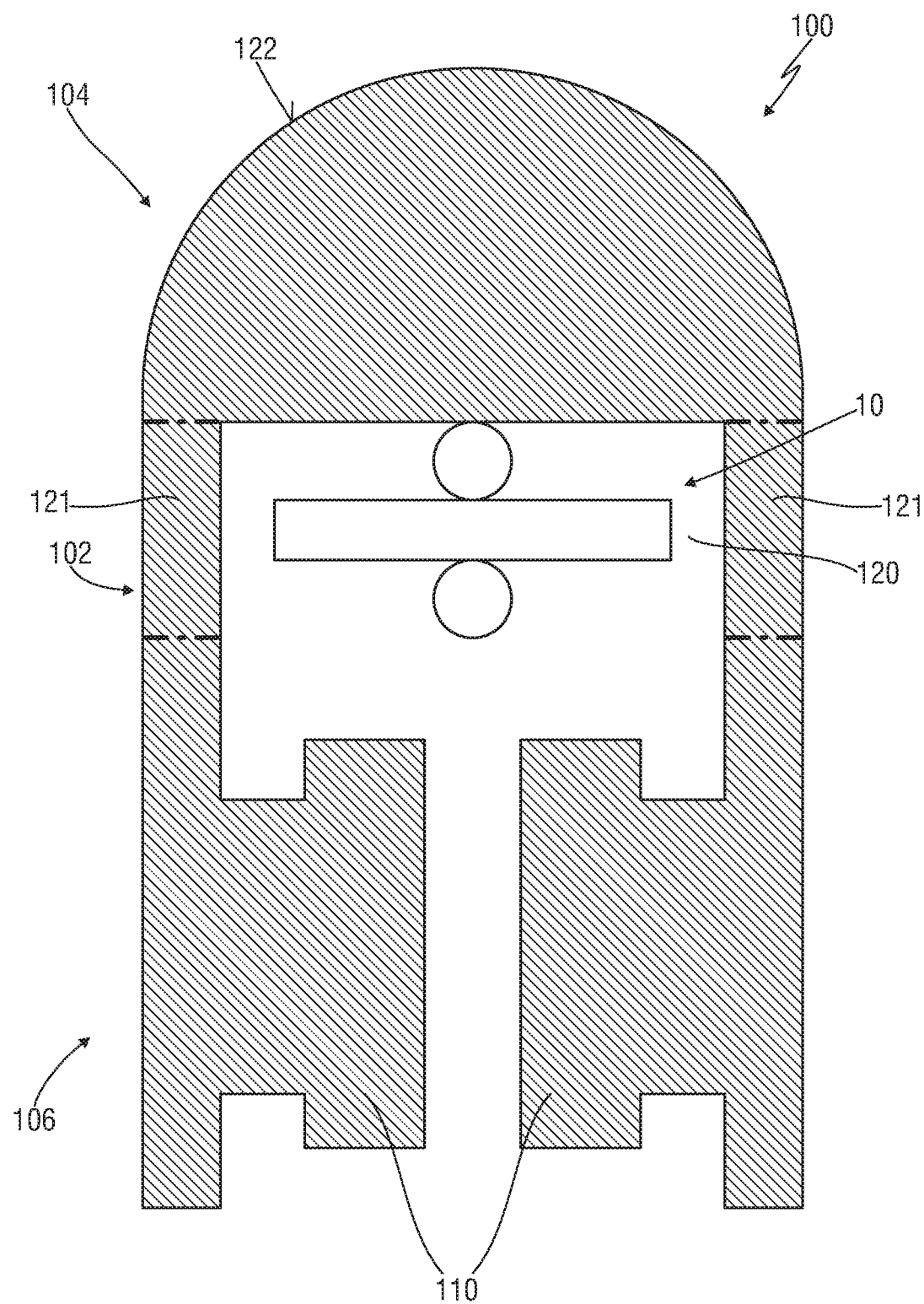
FIG. 7 shows the exemplary embodiment according to FIG. 6 in a cross-sectional view.

FIG. 7 shows the exemplary embodiment of the housing according to FIG. 6 in a cross-section. The same reference numerals refer to the same parts. The partitioning of the housing 100 into the compression body 104, the basic body 102 and the joining section 106 is indicated by the dashed lines. As previously described, in this exemplary embodiment the joining section 106 comprises two connecting elements 110, by means of which a positive-locking connection to a support (not shown here) can be enabled. The connecting elements 110 are designed to be spread apart in order to be mounted on a support.

The basic body 102 comprises a receptacle 120 into which the sensor unit 10 can be inserted. The receptacle 120 is closed at the top by the compression body 104 and on the side by side parts 121 that correspond to the height of the sensor unit 10. In the lower section, i.e. in the transition to the joining section 106, the receptacle 120 is preferably open, so that the sensor unit 10 can be inserted into the basic body 102 through the joining section 106. As with mounting on a support, for this purpose the connecting elements 110 are spread apart and the sensor unit 10 is inserted into the receptacle 120. This way, the sensor unit 10 can be assembled without tools.

In the mounted state, i.e. when the housing 100 is placed on a support, the connecting elements 110 seal the receptacle 120 against water and dirt, so that the sensor is protected against external influences. Preferably, a sensor may thus be produced with a protection class of IP67. In regions in which the electrical contacts to the sensor unit 10 are fed, which is preferably carried out at the top of the sensor, the sealing can be guaranteed with a matching clamping part (not shown here) or by subsequent potting.

The compression region 104 is designed to transfer forces acting on the surface 122 of the compression body 104 to the strip-shaped sensor unit 10. At the same time, the compression body 104 is embodied to suitably attenuate shocks on the sensor 10 so that the sensor unit 10 can be inserted into the receptacle 120 without a further surrounding housing. The compression body is relatively thick compared to the rest of the housing and is designed to be soft and preferably comprises a curved surface 122. The curved surface 122 has the advantage that force acting thereupon is transferred to the sensor 10 uniformly. The sensitivity of the sensor 10 is advantageously increased as a result.

The material from which the housing 110 is made as one piece is preferably foamed polyurethane with a sealed surface. The dimensions of the housing 100 are essentially determined by the sensor unit 10 which is being used. The length of the housing, i.e. in this case the extent in the plane of the figure, is preferably at least a double-digit multiple of the width or the height thereof. The height of the housing is essentially defined by the compression body 104 and the joining section 106, whereas the basic body 102 is as narrow as the sensor unit 10 can be implemented and thus does not contribute significantly to the height. Particularly preferably, the width B of the sensor is less than 1 cm and preferably less than 0.7 cm and in particular 0.5 cm. The sensor is thus particularly good for use as a pinch protection means for automatic doors, gates and windows or for determining whether such automatic doors, gates and window are tightly sealed. A specific application example is described below with reference to FIG. 8.

Figure 8:
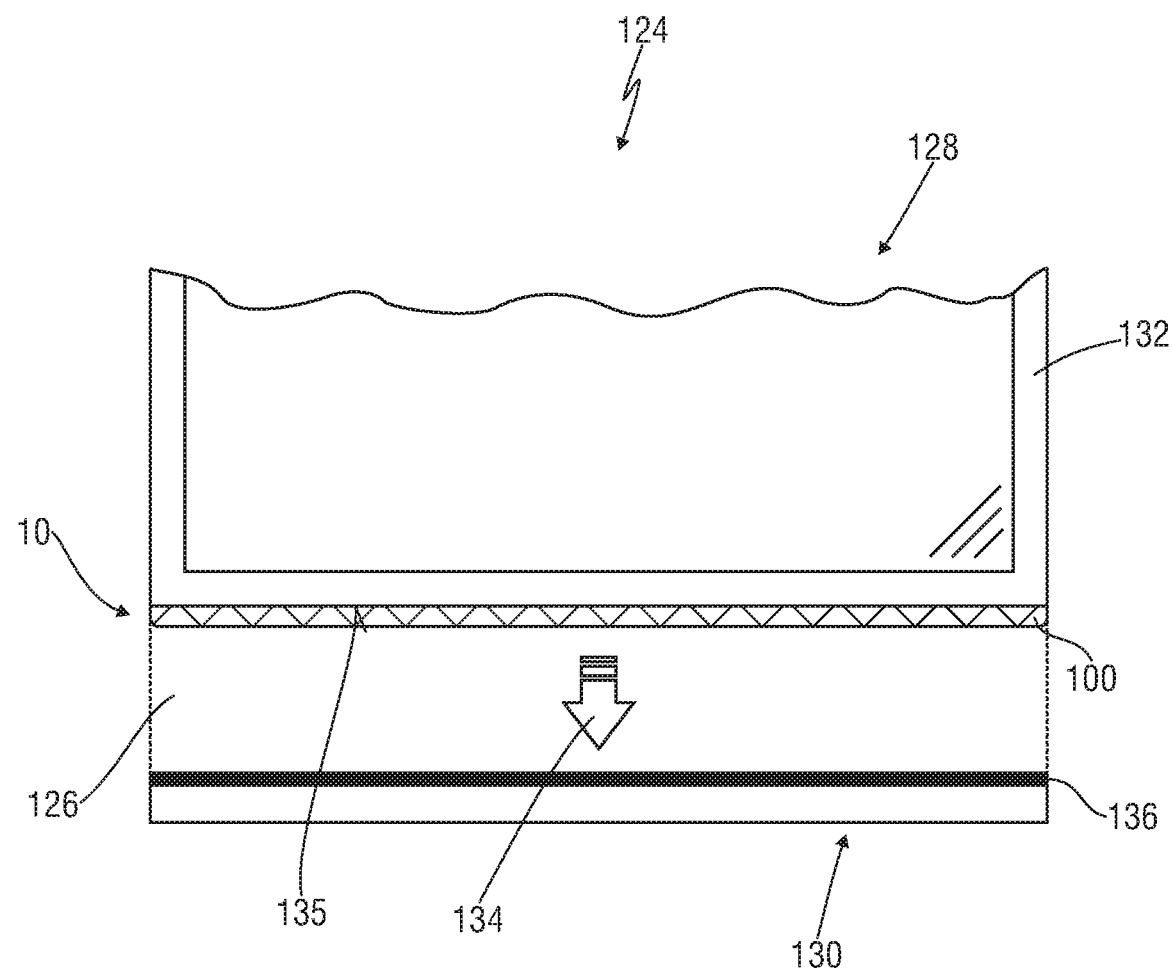
FIG. 8 shows an example of an application of the new sensor.

FIG. 8 shows an automatically closing window 124 on which a sensor 10 according to the invention is disposed. The window 124 is designed to close an opening 126 and has a first part 128 and a second part 130. The first part 128 is a window pane that is disposed in a frame 132 that is movable along the direction of motion represented by the arrow 134. The second part 130 forms the stop with which a lateral edge 135 of the frame 132 comes into flush contact if the window 124 is closing the opening 126.

An embodiment of the new sensor is disposed on said lateral edge 135 on the frame 132 over the entire length. The sensor 10 is designed here to detect whether the opening 126 is fully closed. In another embodiment, the second part 130, which is designed here as a stop and is fixed, may also be movable. The second part 130 preferably comprises a sealing lip 136 that is designed similarly to the housing 100 of the new sensor 10 in cross-section. Thereby, the sealing lip 136 and the housing 100 may act as a seal.

The new sensor enables the sealing of a door, a gate or a window to be checked in a simple way based on a tactile principle. In particular, if the sensor unit 10 is designed to also determine in addition to a load itself the strength thereof or the distribution thereof over the sensor, the sensor can advantageously be used for different applications at the same time, such as for example testing of a sealing and clamping protection.

What is claimed is:

1. A multilayer tactile sensor comprising:
   a first layer comprising a first electrode;
   a second layer comprising a second electrode;
   an intermediate layer of pressure-sensitive material that is disposed between the first layer and the second layer and spaces apart the first electrode from the second electrode; and
   a fastening means for fixing the first electrode and the second electrode in relation to each other,
   wherein the first electrode and the second electrode are made of electrically conductive yarn and extend in parallel to one another in a defined longitudinal direction L, and
   wherein the fastening means comprises at least a first seam that extends along the longitudinal direction L and that comprises at least one thread that is fed repeatedly multiple times through the pressure-sensitive material in order to fix the first electrode in a defined position.

2. The multilayer tactile sensor according to claim 1, wherein the first seam comprises a number of entry and exit openings that are disposed in parallel and at a defined distance from the conductive yarn of the first electrode.

3. The multilayer tactile sensor according to claim 1, wherein:
the first layer is a first textile sheet into which the first electrode is sewn or woven and p1 the thread of the first seam is fed repeatedly multiple times through the pressure-sensitive material and the first textile sheet.

4. The multilayer tactile sensor according to claim 3, wherein:
the second layer is a second textile sheet into which the second electrode is sewn or woven, and
the thread of the first seam is fed repeatedly multiple times through the pressure-sensitive material, the first textile sheet, and the second textile sheet.

5. The multilayer tactile sensor according to claim 4, wherein the first textile sheet and the second textile sheet are sections of a common textile sheet that are folded over each other at a lateral edge of the intermediate layer and thus form the first and second layers of the multilayer tactile sensor.

6. The multilayer tactile sensor according to claim 5, wherein:
the first seam runs parallel to the lateral edge and
the first and second electrodes are disposed between the first seam and the lateral edge.

7. The multilayer tactile sensor according to claim 1, wherein the fastening means comprises a second seam that is disposed parallel to the first seam so that the first electrode is disposed between the first and second seams.

8. The multilayer tactile sensor according to claim 1, wherein the thread of the first seam repeatedly overlaps the conductive yarn of the first electrode and holds the first electrode on the intermediate layer.

9. The multilayer tactile sensor according to claim 1, wherein the fastening means comprises a further seam with at least one further thread that is repeatedly fed through below the electrically conductive yarn in order to space the first electrode apart from the intermediate layer.

10. The multilayer tactile sensor according to claim 9, wherein:
the thread of the first seam crosses the first electrode at a first defined interval $d_1$,
the thread of the further seam crosses the first electrode at a second defined interval $d_2$, and
the first and the second defined intervals are different.

11. A method for assembling a multilayer tactile sensor, the method comprising the steps of:
providing a first electrode that forms a first layer and a second electrode that forms a second layer;
providing an intermediate layer of pressure-sensitive material that is disposed between the first layer and the second layer and that spaces apart the first electrode from the second electrode; and
fixing the first electrode and the second electrodes relative to each other,
wherein the first electrode and the second electrode are made of electrically conductive yarn and extend in parallel to one another in a defined longitudinal direction L, and
wherein the fixing step is performed by forming at least a first seam that extends in the longitudinal direction L using at least one thread that is fed repeatedly multiple times through the pressure-sensitive material in order to fix the first electrode in a defined position.

12. The multilayer tactile sensor according to claim 9 wherein the at least one further thread is repeatedly fed through below the electrically conductive yarn over an entire length of the first electrode.

13. The multilayer tactile sensor according to claim 1, wherein the first seam is a first zigzag seam with at least one thread defining a first zigzag pattern having short sections that are concatenated at acute angles so that the ends thereof describe two parallel lines or curves, between which the first electrode is disposed in parallel.

14. The multilayer tactile sensor according to claim 8, wherein the thread of the first seam repeatedly overlaps the conductive yarn of the first electrode over an entire length of the first electrode.

* * * * *

UNITED STATES PATENT AND TRADEMARK OFFICE
CERTIFICATE OF CORRECTION

Page 1 of 1

PATENT NO. : 10,663,360 B2
APPLICATION NO. : 15/869153
DATED : May 26, 2020
INVENTOR(S) : Ibrocevic et al.

It is certified that error appears in the above-identified patent and that said Letters Patent is hereby corrected as shown below:

In the Claims

Claim 3, Column 13, Line 6   "and p1 the" should be --and ¶ the--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*